(12) United States Patent
Schwarz et al.

(10) Patent No.: US 12,202,118 B2
(45) Date of Patent: Jan. 21, 2025

(54) POWER TOOLS AND POWER TOOLS PLATFORM

(71) Applicant: Black & Decker Inc., New Britain, CT (US)

(72) Inventors: Daniel L. Schwarz, Timonium, MD (US); Patrick J. Tilson, Towson, MD (US); Ethan L. Helmer, Baltimore, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 17/515,921

(22) Filed: Nov. 1, 2021

(65) Prior Publication Data

US 2022/0048179 A1 Feb. 17, 2022

Related U.S. Application Data

(63) Continuation of application No. 16/941,154, filed on Jul. 28, 2020.
(Continued)

(51) Int. Cl.
*B25F 5/02* (2006.01)
*B05C 17/005* (2006.01)
(Continued)

(52) U.S. Cl.
CPC .......... *B25F 5/02* (2013.01); *B05C 17/00523* (2013.01); *B25F 3/00* (2013.01);
(Continued)

(58) Field of Classification Search
CPC .... B25F 5/02; B25F 3/00; B25F 5/00; H01M 50/20; H01M 2220/30; Y02E 60/10
(Continued)

(56) References Cited

U.S. PATENT DOCUMENTS

| 568,539 A | 9/1896 | McCoy |
|---|---|---|
| 762,650 A | 6/1904 | O |

(Continued)

FOREIGN PATENT DOCUMENTS

| CN | 2042568 U | 8/1989 |
|---|---|---|
| CN | 200984676 Y | 12/2007 |

(Continued)

OTHER PUBLICATIONS

EP EESR dated Oct. 16, 2020 in corresponding EP application 20189850.9.
(Continued)

*Primary Examiner* — M Baye Diao
(74) *Attorney, Agent, or Firm* — Stephen R. Valancius

(57) ABSTRACT

A power tool system includes a removable battery pack a first tool and a second tool. The first tool includes a first base housing that is selectively engageable with the removable battery pack and a first tool portion connected to the first base housing by a first connecting section. The second tool includes a second base housing that is selectively engageable with the removable battery pack and a second tool portion connected to the second base housing by a second connecting section. The second tool base housing houses a second controller that provides a proportional power delivery system for the second tool and second tool base housing also includes a second actuator for providing user control of the second tool.

24 Claims, 6 Drawing Sheets

Related U.S. Application Data

(60) Provisional application No. 62/884,309, filed on Aug. 8, 2019.

(51) Int. Cl.

| | |
|---|---|
| *B25F 3/00* | (2006.01) |
| *H01M 50/20* | (2021.01) |
| *H01M 50/247* | (2021.01) |
| *H01M 50/284* | (2021.01) |
| *B23K 3/03* | (2006.01) |
| *F04D 25/06* | (2006.01) |
| *F21L 4/04* | (2006.01) |

(52) U.S. Cl.
CPC ......... *H01M 50/20* (2021.01); *H01M 50/247* (2021.01); *H01M 50/284* (2021.01); *B23K 3/0323* (2013.01); *F04D 25/0673* (2013.01); *F21L 4/04* (2013.01); *H01M 2220/30* (2013.01)

(58) Field of Classification Search
USPC ........................................................ 320/107
See application file for complete search history.

(56) References Cited

U.S. PATENT DOCUMENTS

| | | | |
|---|---|---|---|
| 1,470,197 A | 10/1923 | Ryther | |
| 2,040,517 A | 5/1936 | Kopsch | |
| 2,056,951 A | 10/1936 | Bohall et al. | |
| 2,413,422 A | 12/1946 | Teige et al. | |
| 2,591,287 A | 4/1952 | Pellar et al. | |
| 2,682,413 A | 6/1954 | Tripp | |
| 2,777,703 A | 1/1957 | Pickett et al. | |
| 3,247,360 A | 4/1966 | Ponder | |
| 3,287,541 A | 11/1966 | Weller et al. | |
| 3,430,816 A | 3/1969 | Nadherny et al. | |
| 3,480,759 A | 11/1969 | Ernst et al. | |
| 3,697,724 A | 10/1972 | Hombrecher | |
| 3,706,871 A | 12/1972 | Witherow | |
| 3,712,633 A | 1/1973 | Schadlich | |
| 3,984,655 A | 10/1976 | Wahl | |
| 4,050,003 A | 9/1977 | Owings et al. | |
| 4,064,447 A | 12/1977 | Edgell et al. | |
| 4,117,854 A | 10/1978 | Rosenbloom | |
| 4,370,579 A * | 1/1983 | Kobayashi ............. | H02K 23/66 310/239 |
| 4,505,170 A | 3/1985 | Van Laere | |
| 4,619,162 A | 10/1986 | Van Laere | |
| 4,671,476 A | 6/1987 | Yim | |
| 4,826,049 A | 5/1989 | Speer | |
| D304,368 S | 10/1989 | Suzuki | |
| 4,883,942 A | 11/1989 | Robak, Sr. et al. | |
| 4,905,423 A | 3/1990 | Van Laere | |
| D308,932 S | 7/1990 | Straub | |
| 4,998,589 A | 3/1991 | Wiesendanger | |
| 5,123,430 A | 6/1992 | Davidovitz | |
| 5,144,217 A * | 9/1992 | Gardner ............. | H01M 50/213 320/110 |
| 5,446,262 A | 8/1995 | McCambridge | |
| 5,495,093 A | 2/1996 | Griffith | |
| 5,780,819 A | 7/1998 | Fabrikant et al. | |
| 5,811,766 A | 9/1998 | Fabrikant et al. | |
| 5,831,245 A | 11/1998 | Debourg et al. | |
| 5,865,499 A * | 2/1999 | Keyser ..................... | B60P 3/34 296/156 |
| 6,007,373 A | 12/1999 | Chew | |
| 6,215,104 B1 | 4/2001 | Kurpiela et al. | |
| 6,260,985 B1 | 7/2001 | Zeller | |
| 6,286,609 B1 * | 9/2001 | Carrier ..................... | H02P 7/291 173/217 |
| 6,417,894 B1 | 7/2002 | Goff et al. | |
| 6,502,949 B1 | 1/2003 | Horiyama et al. | |
| 6,527,143 B1 | 3/2003 | Schomäcker | |
| 6,575,590 B1 | 6/2003 | Wadsworth | |
| 6,641,145 B1 | 11/2003 | Nebe et al. | |
| 6,646,228 B2 | 11/2003 | Axinte et al. | |
| 6,797,924 B1 | 9/2004 | Axinte et al. | |
| 6,805,205 B1 * | 10/2004 | Gabard ................. | A01B 45/02 172/21 |
| 6,820,768 B2 | 11/2004 | Belanger | |
| 6,942,229 B2 * | 9/2005 | Brazell ................... | B25H 1/04 280/30 |
| 6,965,812 B2 | 11/2005 | Wang et al. | |
| 7,064,520 B2 | 6/2006 | Heigl et al. | |
| 7,131,364 B2 * | 11/2006 | Brazell ................... | B25H 1/04 248/676 |
| D536,718 S | 2/2007 | Murray | |
| 7,222,986 B2 | 5/2007 | Mah | |
| 7,267,125 B2 | 9/2007 | Nevakshonoff | |
| 7,291,809 B2 | 11/2007 | Shigekawa | |
| 7,296,323 B2 * | 11/2007 | Hayama ............. | B23Q 11/0046 15/327.6 |
| 7,428,881 B2 | 9/2008 | Drelinger | |
| 7,446,493 B2 | 11/2008 | Forster et al. | |
| 7,497,275 B2 | 3/2009 | Brotto | |
| 7,551,411 B2 | 6/2009 | Woods et al. | |
| D596,357 S | 7/2009 | Rosen | |
| 7,557,536 B2 | 7/2009 | Lobert et al. | |
| 7,568,451 B2 | 8/2009 | Drelinger | |
| 7,578,598 B2 | 8/2009 | Robinson et al. | |
| D600,413 S | 9/2009 | Khubani | |
| 7,621,652 B2 | 11/2009 | Zick | |
| 7,733,054 B2 | 6/2010 | Phillips et al. | |
| 7,745,760 B2 | 6/2010 | Shigekawa | |
| 7,817,384 B2 | 10/2010 | Woods et al. | |
| 7,942,211 B2 | 5/2011 | Scrimshaw et al. | |
| 7,942,617 B2 | 5/2011 | Allemann et al. | |
| 8,002,432 B2 | 8/2011 | Chen et al. | |
| 8,056,764 B2 | 11/2011 | Paasch et al. | |
| 8,222,868 B2 | 7/2012 | Buckner et al. | |
| 8,446,120 B2 * | 5/2013 | Forster .................... | B25F 5/001 318/507 |
| 8,606,540 B2 * | 12/2013 | Haisty ................... | G01B 21/10 702/158 |
| 8,636,081 B2 * | 1/2014 | Ludy .................... | B25D 11/005 173/217 |
| 8,657,031 B2 | 2/2014 | Kononenko et al. | |
| 8,708,346 B2 | 4/2014 | Harrison et al. | |
| 8,842,427 B2 | 9/2014 | Makita | |
| 8,882,378 B2 | 11/2014 | Bylsma et al. | |
| 8,894,377 B2 | 11/2014 | Greenberg | |
| 8,984,711 B2 | 3/2015 | Ota et al. | |
| 8,991,806 B2 * | 3/2015 | Meyer ..................... | B25H 1/06 83/437.1 |
| 9,061,412 B2 | 6/2015 | Hahn | |
| 9,205,497 B2 | 12/2015 | Harrison et al. | |
| 9,267,698 B2 | 2/2016 | Stearns | |
| 9,273,857 B2 | 3/2016 | Rosenbecker et al. | |
| 9,303,852 B2 * | 4/2016 | Staeubli ................. | F21V 21/145 |
| 9,337,677 B2 * | 5/2016 | Suzuki ................... | H02J 7/0025 |
| D768,931 S | 10/2016 | Langberg et al. | |
| D768,932 S | 10/2016 | Langberg et al. | |
| D769,529 S | 10/2016 | Langberg et al. | |
| 9,491,997 B2 | 11/2016 | Yiu | |
| 9,539,691 B2 | 1/2017 | Hirschburger | |
| 9,539,716 B2 * | 1/2017 | Leupert ................... | B25G 1/102 |
| 9,583,745 B2 * | 2/2017 | White ................. | H01M 50/597 |
| 9,583,746 B2 | 2/2017 | Ota et al. | |
| D780,998 S | 3/2017 | Yiu | |
| 9,620,989 B2 | 4/2017 | Meoli | |
| 9,878,432 B2 * | 1/2018 | Linehan .................... | B25F 5/00 |
| 9,956,677 B2 | 5/2018 | Baskar et al. | |
| 10,005,147 B2 | 6/2018 | Zerweck et al. | |
| 10,039,367 B2 * | 8/2018 | Yamaoka ................. | A47L 5/14 |
| 10,056,582 B2 | 8/2018 | White et al. | |
| 10,070,624 B2 | 9/2018 | Davis et al. | |
| 10,131,042 B2 | 11/2018 | Mergener et al. | |
| 10,131,043 B2 | 11/2018 | Mergener et al. | |
| 10,213,908 B2 | 2/2019 | Mergener et al. | |
| D843,800 S | 3/2019 | Jiang et al. | |
| 10,272,558 B2 | 4/2019 | Christophersen et al. | |

(56) References Cited

U.S. PATENT DOCUMENTS

| | | | |
|---|---|---|---|
| 10,304,324 | B2 | 5/2019 | Smith |
| 10,326,399 | B2 | 6/2019 | Hirschburger |
| D854,257 | S | 7/2019 | Hollinger |
| 10,350,746 | B2 * | 7/2019 | Martinez .................. A45F 3/04 |
| 10,404,709 | B2 | 9/2019 | Borkowicz et al. |
| 10,500,707 | B2 | 12/2019 | Hirschburger |
| 10,525,582 | B2 | 1/2020 | Qiu et al. |
| D876,730 | S | 2/2020 | He |
| 10,549,396 | B2 | 2/2020 | Matsunaga et al. |
| 10,587,134 | B2 | 3/2020 | Kondo et al. |
| 10,897,149 | B2 | 1/2021 | Byrne et al. |
| 10,903,781 | B2 | 1/2021 | Levin |
| 11,465,268 | B2 * | 10/2022 | Zhu ........................... B25F 5/02 |
| 2002/0129949 | A1 | 9/2002 | Bongers-Ambrosius et al. |
| 2002/0134811 | A1 * | 9/2002 | Napier .................... B24B 23/04 |
| | | | 227/134 |
| 2003/0161146 | A1 | 8/2003 | Sharrah et al. |
| 2005/0111214 | A1 | 5/2005 | Zeiler |
| 2005/0157489 | A1 | 7/2005 | Oomori et al. |
| 2005/0200087 | A1 | 9/2005 | Vasudeva et al. |
| 2005/0245183 | A1 | 11/2005 | Deshpande et al. |
| 2005/0247692 | A1 | 11/2005 | Axinte et al. |
| 2005/0267776 | A1 | 12/2005 | Selby |
| 2006/0221602 | A1 | 10/2006 | Zick |
| 2007/0186867 | A1 | 8/2007 | Mulloy |
| 2007/0227310 | A1 | 10/2007 | Roehm et al. |
| 2007/0272725 | A1 | 11/2007 | Zerweck et al. |
| 2008/0012526 | A1 * | 1/2008 | Sadow ................... H02J 7/0044 |
| | | | 320/111 |
| 2008/0069694 | A1 | 3/2008 | Hernandez et al. |
| 2008/0179309 | A1 | 7/2008 | Markovsky et al. |
| 2008/0277546 | A1 | 11/2008 | Kahn |
| 2008/0302226 | A1 * | 12/2008 | Fischer ................ B23D 59/002 |
| | | | 83/520 |
| 2009/0065227 | A1 * | 3/2009 | Lin ........................ B25B 21/00 |
| | | | 173/217 |
| 2009/0207035 | A1 | 8/2009 | Watanabe et al. |
| 2010/0000067 | A1 * | 1/2010 | Turner ...................... B25F 5/02 |
| | | | 429/97 |
| 2010/0053943 | A1 * | 3/2010 | Zick ...................... F21V 21/406 |
| | | | 362/183 |
| 2011/0226270 | A1 | 9/2011 | Rivera |
| 2011/0269336 | A1 | 11/2011 | Nashimoto et al. |
| 2011/0279090 | A1 * | 11/2011 | Bauer .................... H02J 7/0042 |
| | | | 307/77 |
| 2011/0291617 | A1 | 12/2011 | Rosenbecker |
| 2012/0177429 | A1 | 7/2012 | Martinez De San Vicente Oliveras |
| 2012/0269663 | A1 | 10/2012 | Kamiya |
| 2013/0314055 | A1 | 11/2013 | Van Der Linde et al. |
| 2014/0068952 | A1 | 3/2014 | Soreo et al. |
| 2014/0069672 | A1 | 3/2014 | Mashiko et al. |
| 2014/0151079 | A1 | 6/2014 | Furui et al. |
| 2015/0023786 | A1 | 1/2015 | Li et al. |
| 2015/0136434 | A1 | 5/2015 | Aoki et al. |
| 2015/0137715 | A1 * | 5/2015 | Brotto .................. H02J 7/0019 |
| | | | 318/139 |
| 2015/0194646 | A1 * | 7/2015 | Yoshinari .................. B25F 5/00 |
| | | | 429/187 |
| 2015/0202753 | A1 * | 7/2015 | Mittmann ............ B23K 3/0338 |
| | | | 362/120 |
| 2015/0247644 | A1 | 9/2015 | Stearns |
| 2015/0256111 | A1 | 9/2015 | Forster et al. |
| 2015/0306674 | A1 | 10/2015 | Hsiao |
| 2016/0029768 | A1 | 2/2016 | Dai |
| 2016/0099575 | A1 | 4/2016 | Velderamn |
| 2016/0336559 | A1 * | 11/2016 | White ...................... H02J 7/02 |
| 2017/0036337 | A1 | 2/2017 | Sawano et al. |
| 2017/0072553 | A1 | 3/2017 | Bakker |
| 2017/0106520 | A1 | 4/2017 | Schadow et al. |
| 2017/0130912 | A1 | 5/2017 | Keller |
| 2018/0056496 | A1 | 3/2018 | Rubens et al. |
| 2018/0076653 | A1 | 3/2018 | Forster |
| 2018/0111213 | A1 | 4/2018 | Mantes et al. |
| 2018/0111259 | A1 | 4/2018 | Takeda et al. |
| 2018/0175644 | A1 | 6/2018 | Eshleman et al. |
| 2018/0175757 | A1 | 6/2018 | Tanimoto |
| 2018/0207785 | A1 * | 7/2018 | Baskar ...................... B25F 5/02 |
| 2018/0311807 | A1 | 11/2018 | Sergyeyenko et al. |
| 2019/0027002 | A1 * | 1/2019 | Esenwein ............. H04W 4/021 |
| 2019/0039227 | A1 | 2/2019 | Takeda et al. |
| 2019/0134730 | A1 * | 5/2019 | Teraoka ................ B23K 3/0323 |
| 2019/0143495 | A1 | 5/2019 | Mergener et al. |
| 2020/0078921 | A1 | 3/2020 | Sawano et al. |
| 2020/0101586 | A1 | 4/2020 | Sawano et al. |
| 2020/0368892 | A1 | 11/2020 | Gaddis et al. |
| 2020/0403544 | A1 | 12/2020 | Ishikawa et al. |
| 2021/0220925 | A1 | 7/2021 | Knight et al. |
| 2021/0354280 | A1 | 11/2021 | Jenkins et al. |
| 2022/0125267 | A1 | 4/2022 | Tagami |
| 2022/0183241 | A1 | 6/2022 | Liu |

FOREIGN PATENT DOCUMENTS

| | | | | |
|---|---|---|---|---|
| CN | 201282155 | Y * | 7/2009 | ............... B25F 5/02 |
| CN | 201483459 | U * | 5/2010 | ............. B25C 1/008 |
| CN | 201572729 | U | 9/2010 | |
| CN | 204496105 | U | 7/2015 | |
| CN | 104959697 | A | 10/2015 | |
| CN | 204824920 | U | 12/2015 | |
| CN | 105785564 | A | 7/2016 | |
| CN | 205876748 | U | 1/2017 | |
| CN | 206723102 | U | 12/2017 | |
| CN | 206860510 | U | 1/2018 | |
| CN | 207555546 | U | 6/2018 | |
| CN | 208076825 | U | 11/2018 | |
| CN | 208106798 | U | 11/2018 | |
| CN | 208147089 | U | 11/2018 | |
| CN | 208494795 | U | 2/2019 | |
| CN | 208853894 | U | 5/2019 | |
| CN | 110242599 | A | 9/2019 | |
| CN | 209458167 | U | 10/2019 | |
| CN | 209970389 | U | 1/2020 | |
| CN | 110802295 | A | 2/2020 | |
| CN | 210196079 | U | 3/2020 | |
| CN | 211160516 | U | 8/2020 | |
| DE | 29508404 | U1 | 8/1995 | |
| DE | 102010062008 | A1 | 5/2012 | |
| DE | 102012200913 | A1 | 7/2013 | |
| DE | 102016106782 | A1 * | 10/2017 | ........... B24B 23/005 |
| EP | 0371076 | B1 | 11/1992 | |
| EP | 0526386 | A1 | 2/1993 | |
| EP | 0890420 | A1 | 1/1999 | |
| EP | 2923662 | A2 | 9/2015 | |
| EP | 3315264 | A1 | 5/2018 | |
| EP | 3450112 | A1 | 3/2019 | |
| EP | 3687726 | B1 * | 8/2021 | ............. B23D 45/16 |
| GB | 2191396 | A | 12/1987 | |
| GB | 2529529 | A * | 2/2016 | ......... A61B 17/1622 |
| JP | 3216040 | A2 | 9/1991 | |
| JP | 3221703 | A2 | 9/1991 | |
| JP | 2001062724 | A | 3/2001 | |
| JP | 2001258634 | A | 9/2001 | |
| KR | 20110104377 | A | 9/2011 | |
| KR | 20160116140 | A | 10/2016 | |
| WO | 8910324 | A1 | 11/1989 | |
| WO | WO-2013014878 | A1 * | 1/2013 | ........ H01M 10/4207 |
| WO | 2013137480 | A2 | 9/2013 | |
| WO | 2014050471 | A1 | 4/2014 | |
| WO | 2014125758 | A1 | 8/2014 | |

OTHER PUBLICATIONS

Black & Decker CI500S Dual Temperature Soldering and Craft Iron—https://us.amazon.com/Black-Decker-CI500S-Dual-Temperature-Soldering-and-Craft-Iron/dp/B000BASSKI.

Dewalt DCL 510 LED worklight—https://www.dewalt.com/products/storage-and-gear/jobsite-lighting-and-flashlights/12v-max-led-worklight/dcl510.

Black + Decker RTX Rotary Tool—https://www.amazon.com/BLACK-DECKER-RTX-B-Rotary-Storage/dp/B000MUSLCC.

(56) References Cited

OTHER PUBLICATIONS

Black & Decker VPX1404 Lithium-ion Flashlight—https://www.amazon.com/black-decker-vpx1401-lithium-ion- flashlight/dp/b000umjj7s.
Ryobi P3100 18 Volt One+ Hybrid Soldering Station—https://www.homedepot.com/p/RYOBI-18-Volt-ONE-Hybrid-Soldering-Station-Tool-Only-P3100/305124211.
Ryobi P3105 18 Volt One+ 40 Watt Soldering Iron—https://www.homedepot.com/p/RYOBI-18-Volt-ONE-40-Watt-Soldering-Iron-Tool-Only-P3105/305124212.
Milwaukee 2488 Soldering Iron—https://www.milwaukeetool.com/Products/Power-Tools/Specialty-Tools/Heating-Tools/2488-20.
Black & Decker CI500S Dual Temperature Soldering and Craft Iron—https://us.amazon.com/Black-Decker-CI500S-Dual-Temperature-Soldering-and-Craft-Iron/dp/B000BASSKI; (1) First Available Date listed as Jul. 7, 2011; Website Accessed Aug. 19, 2020.
Dewalt DCL510 LED worklight—https://www.dewalt.com/products/storage-and-gear/jobsite-lighting-and- flashlights/12v-max-led-worklight/dcl510; Website Accessed Aug. 19, 2020.
Black + Decker RTX Rotary Tool—https://www.amazon.com/BLACK-DECKER-RTX-B-Rotary-Storage/dp/B000MUSLCC; First Available Date listed as January 23, 2007; Website Accessed Aug. 19, 2020.
Black & Decker VPX1404 Lithium-ion Flashlight—https://www.amazon.com/black-decker-vpx1401-lithium-ion-flashlight/dp/b000umjj7s; First Available Date listed as Sep. 1, 2007; Website Accessed August 19, 2020.
Ryobi P3100 18 Volt One+ Hybrid Soldering Station—https://www.homedepot.com/p/RYOBI-18-Volt-ONE-Hybrid-Soldering-Station-Tool-Only-P3100/305124211; Website Accessed Aug. 19, 2020.
Ryobi P3105 18 Volt One+ 40 Watt Soldering Iron—https://www.homedepot.com/p/RYOBI-18-Volt-ONE-40-Watt-Soldering-Iron-Tool-Only-P3105/305124212; Website Accessed Aug. 19, 2020.
Milwaukee 2488 Soldering Iron—https://www.milwaukeetool.com/Products/Power-Tools/Specialty-Tools/Heating-Tools/2488-20; Website Accessed Aug. 19, 2020.
Ryobi Hybrid LED Light P790 and Soldering Station P3100—https://www.homedepot.com/p/RYOBI-18-Volt-ONE-Hybrid-Soldering-Station-and-Hybrid-LED-Project-Light-Tools-Only-P3100-P790/313765849?mtc=Shopping-B-F_Brand-G-Multi-NA-Multi-NA-Feed; Website Accessed Aug. 19, 2020.
Ex Parte Quayle Action mailed Jul. 8, 2024 in related U.S. Appl. No. 18/217,060, 8 pages.
Non-Final Office Action mailed Jun. 28, 2024 in related U.S. Appl. No. 18/216,341, 15 pages.

* cited by examiner

POWER TOOLS AND POWER TOOLS PLATFORM

CROSS-REFERENCE TO RELATED APPLICATION

This application is a continuation of U.S. application Ser. No. 16/941,154, filed on Jul. 28, 2020, which claims priority and benefit to U.S. Provisional Application No. 62/884,309, filed on Aug. 8, 2019, the entire contents of both are hereby incorporated by reference in their entirety.

BACKGROUND OF THE INVENTION

The present disclosure relates to power tools and a platform for various power tools.

SUMMARY OF EMBODIMENTS OF THE INVENTION

Aspects of the present disclosure relate to a power tool system, tools for the power tool system and tools having a base, a battery pack and a tool. According to an aspect, there is an exemplary embodiment of a power tool system, the system including a removable battery pack. The system further includes a first tool, the first tool including a first base housing that is selectively engageable with the removable battery pack and a first tool portion connected to the first base housing by a first connecting section. The first tool base housing houses a first controller that provides a proportional power delivery system for the first tool. The first tool base housing further comprises a first actuator for providing user control of the first tool. The system further includes a second tool, the second tool including a second base housing that is selectively engageable with the removable battery pack and a second tool portion connected to the second base housing by a second connecting section. The second tool base housing houses a second controller that provides a proportional power delivery system for the second tool. The second tool base housing further comprises a second actuator for providing user control of the second tool.

The first tool base housing may further house a first circuit board and the first controller is mounted on the first circuit board.

The second tool base housing may further house a second circuit board and the second controller is mounted on the second circuit board.

The battery pack may be inserted into the first tool base housing along a first plane.

The first circuit board may be disposed in a first circuit board plane which is substantially parallel to the first plane.

The battery pack may be inserted into the second tool base housing along a second plane.

The second circuit board may be disposed in a second circuit board plane which is substantially parallel to the second plane.

The first actuator may have the same configuration as the second actuator.

The first circuit board may have the same configuration as the second circuit board.

The first controller may provide the proportional power delivery in the range of 80 W to 120 W pulse-width-modulation and the second controller provides the proportional power delivery in the range of 80 W to 120 W pulse-width-modulation.

The first controller and the second controller may provide the same proportional power delivery.

The first tool may be a rotary tool and the second tool may be a soldering tool.

The first connecting section may comprise a cord.

The battery pack may serve as a weighted base for the first tool.

According to another aspect, there is an exemplary embodiment of a power tool system, the system comprising a removable battery pack and a first tool. The first tool includes a first base housing that is selectively engageable with the removable battery pack and a first tool portion connected to the first base housing by a first cord. The first tool base housing houses a first controller that provides a proportional power delivery system for the first tool. The first tool base housing further comprises a first actuator for providing user control of the first tool. The system further includes a second tool, the second tool including a second base housing that is selectively engageable with the removable battery pack and a second tool portion connected to the second base housing by a second cord. The second tool base housing houses a second controller that provides a proportional power delivery system for the second tool. The second tool base housing further comprises a second actuator for providing user control of the second tool.

The first tool base housing may further house a first circuit board and the first controller is mounted on the first circuit board.

The second tool base housing may further house a second circuit board and the second controller may be mounted on the second circuit board.

The battery pack may be inserted into the first tool base housing along a first direction or plane. The first circuit board may be disposed in a first circuit board plane which is substantially parallel to the first plane.

The first circuit board may have the same configuration as the second circuit board.

The first controller may provide the proportional power delivery in the range of 80 W to 120 W pulse-width-modulation and the second controller provides the proportional power delivery in the range of 80 W to 120 W pulse-width-modulation.

The first controller and the second controller may provide the same proportional power delivery.

The first tool may be a rotary tool and the second tool may be a soldering tool.

The battery pack may serve as a weighted base for the first tool.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranged, 2-10, 1-9, 3-9, etc.

BRIEF DESCRIPTION OF THE DRAWINGS

For a better understanding of embodiments of the present invention as well as other objects and further features thereof, reference is made to the following description which is to be used in conjunction with the accompanying drawings, where.

DETAILED DESCRIPTION OF EXEMPLARY EMBODIMENTS OF THE INVENTION

FIGS. 1-7 illustrate an exemplary embodiment of a power tool system. The power tool system includes a variety of tools that utilize a common battery pack 100. The battery pack 100 is a removable power tool battery pack and may be of the type shown in, for example, U.S. Pat. Nos. 7,598,705; 7,661,486; or U.S. Patent Application Publication No. 2018/0331335. U.S. Pat. Nos. 7,598,705; 7,661,486; and U.S. Patent Application Publication No. 2018/0331335 are hereby incorporated by reference.

Figure 2:
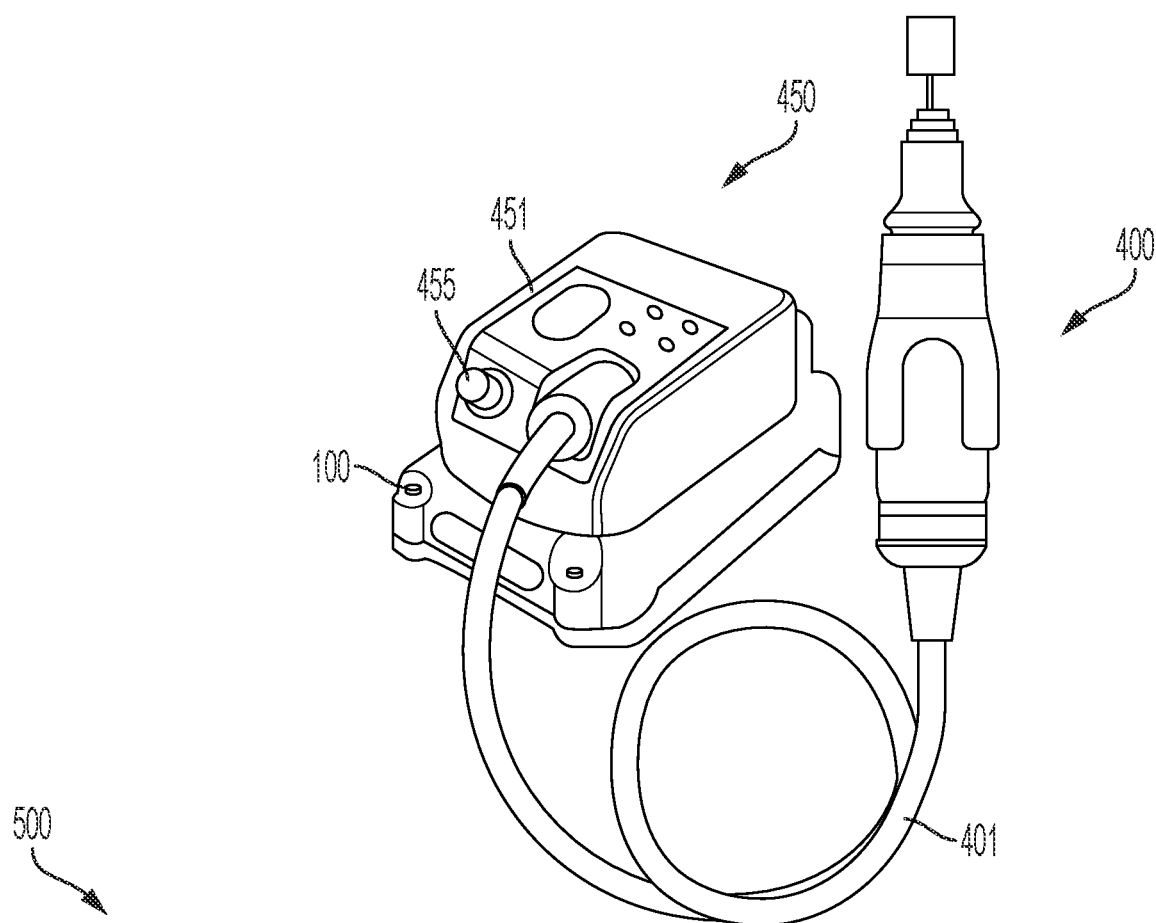
FIG. 2 is a perspective view of an exemplary embodiment of a rotary tool.
Figure 3:
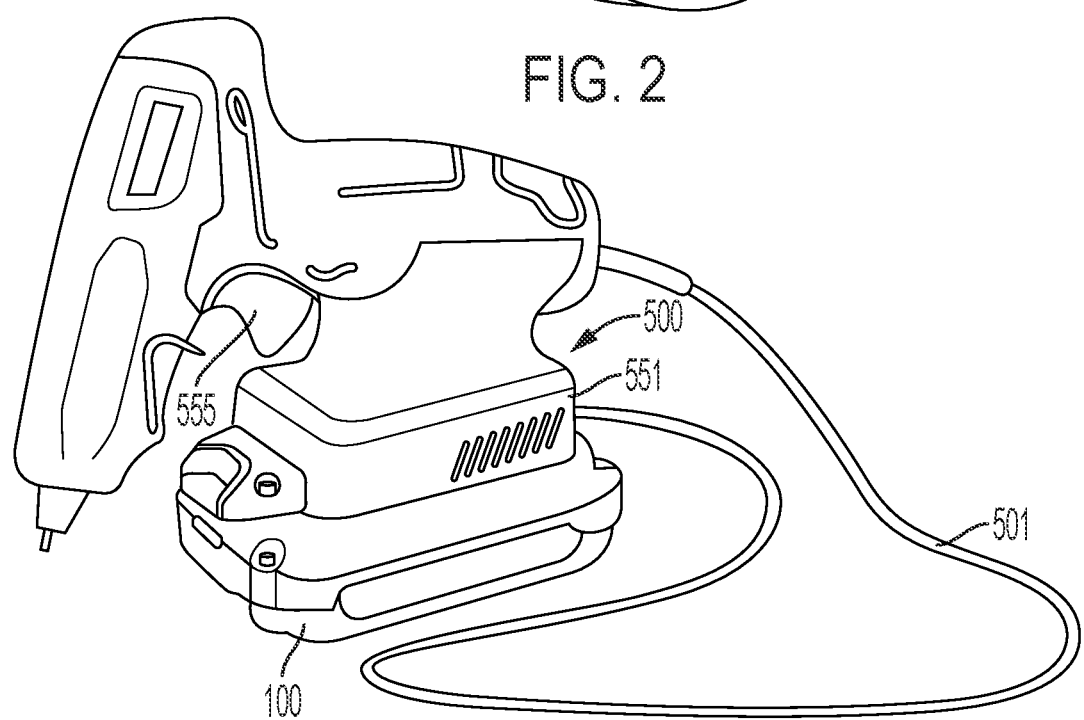
FIG. 3 is a perspective view of an exemplary embodiment of a glue gun.
Figure 4:
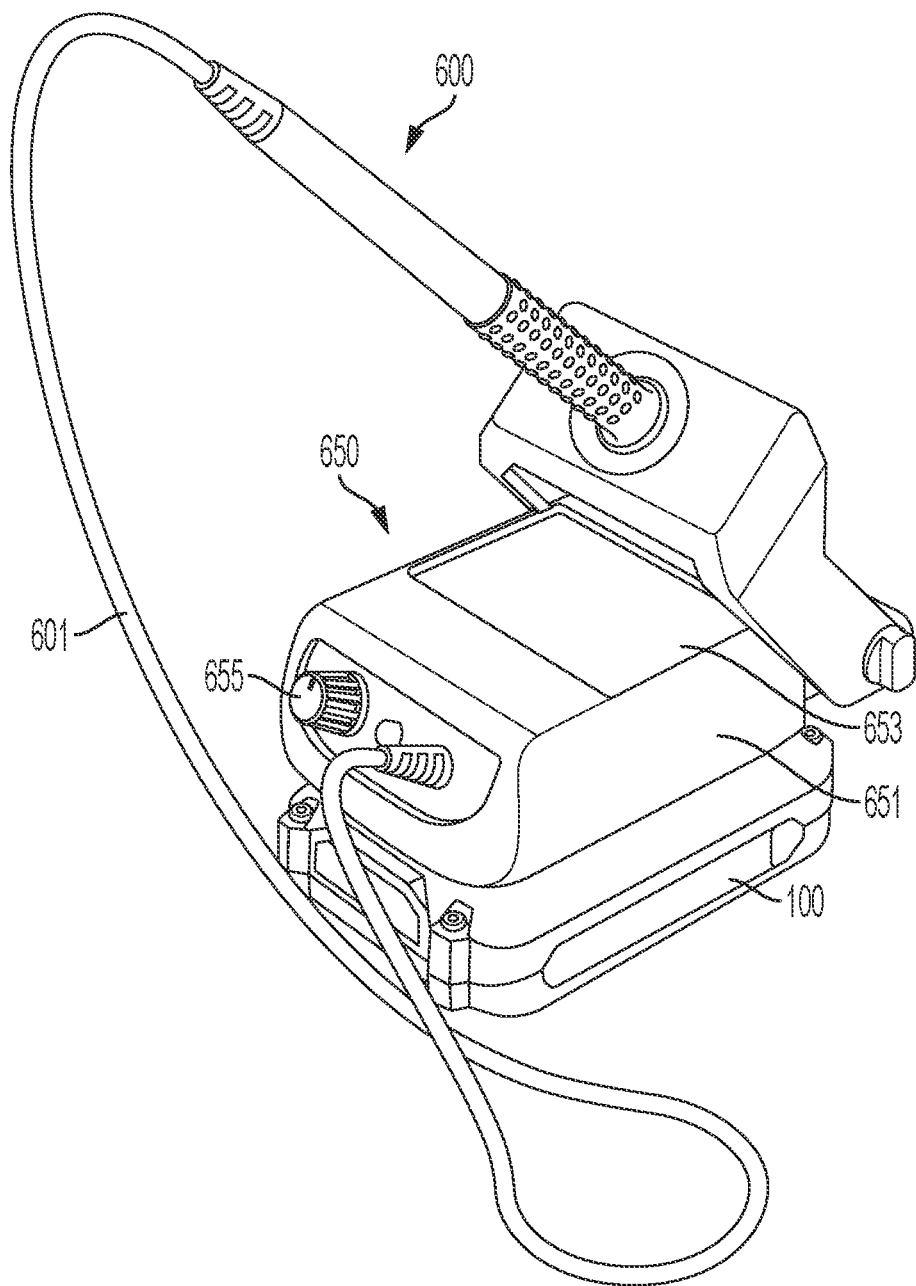
FIG. 4 is a perspective view of an exemplary embodiment of a soldering iron.
Figure 5:
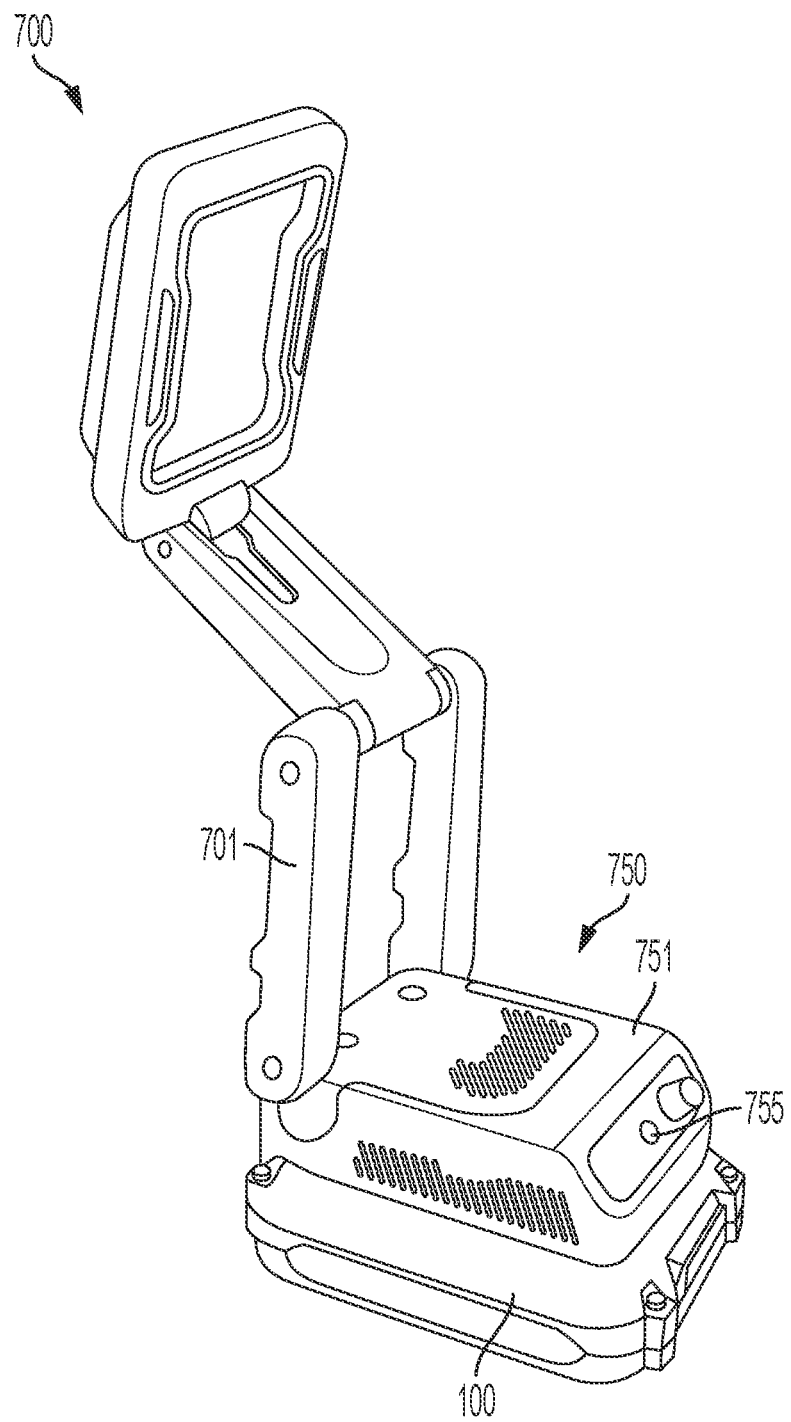
FIG. 5 is a perspective view of an exemplary embodiment of a lamp light.
Figure 6:
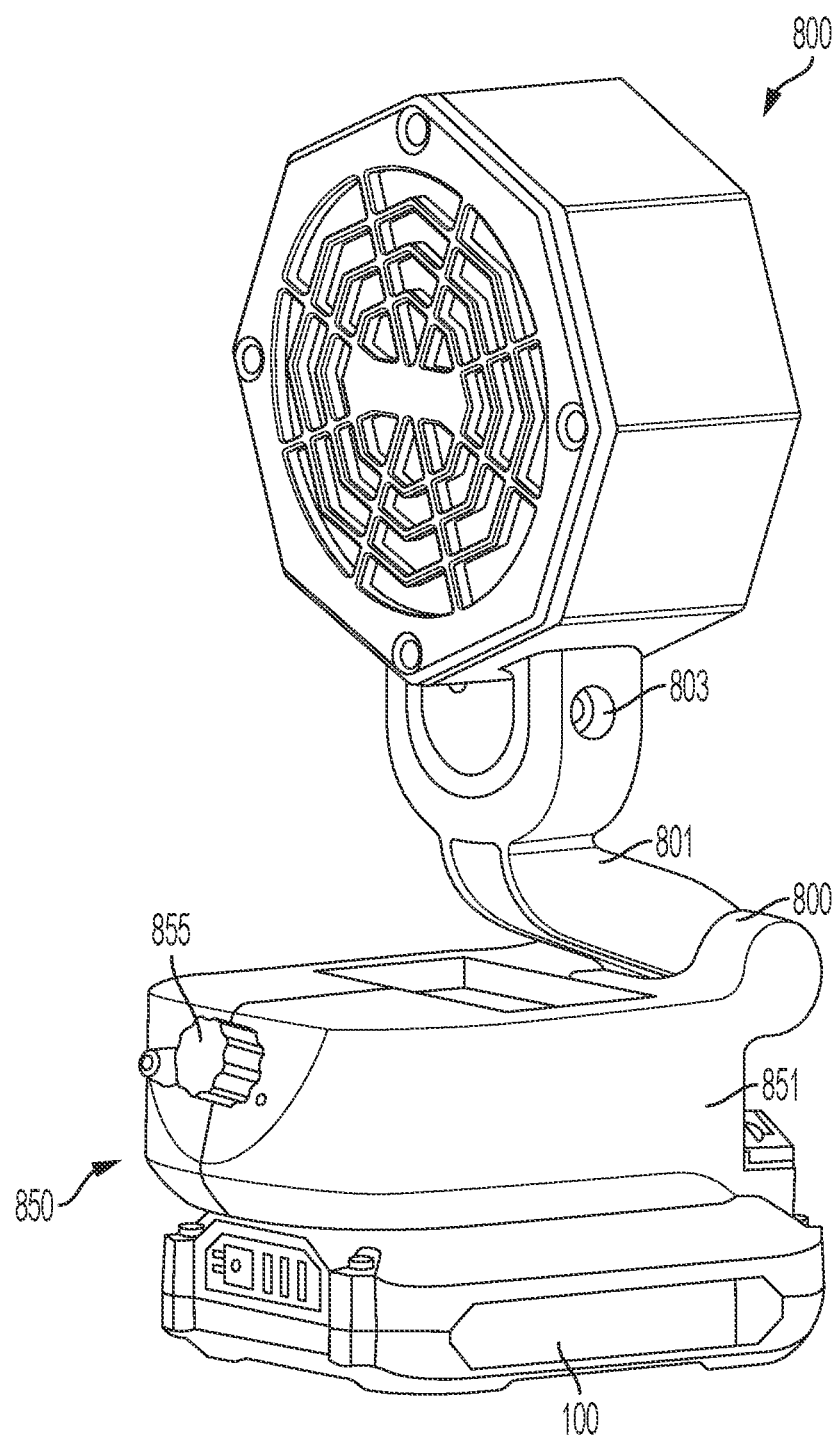
FIG. 6 is a perspective view of an exemplary embodiment of a fan.

Each tool in the power tool system of the exemplary embodiment also includes a common base 200. Each tool then is built incorporating this common base 200. For example, the specific tools may include a rotary tool 400, as shown in FIG. 2; a hot glue gun 500, as shown in FIG. 3; a soldering iron 600, as shown in FIG. 4; a lamp light 700, as shown in FIG. 5; or a fan 800, as shown in FIG. 6. Each of these tools is also powered by a battery pack 100.

Figure 1:
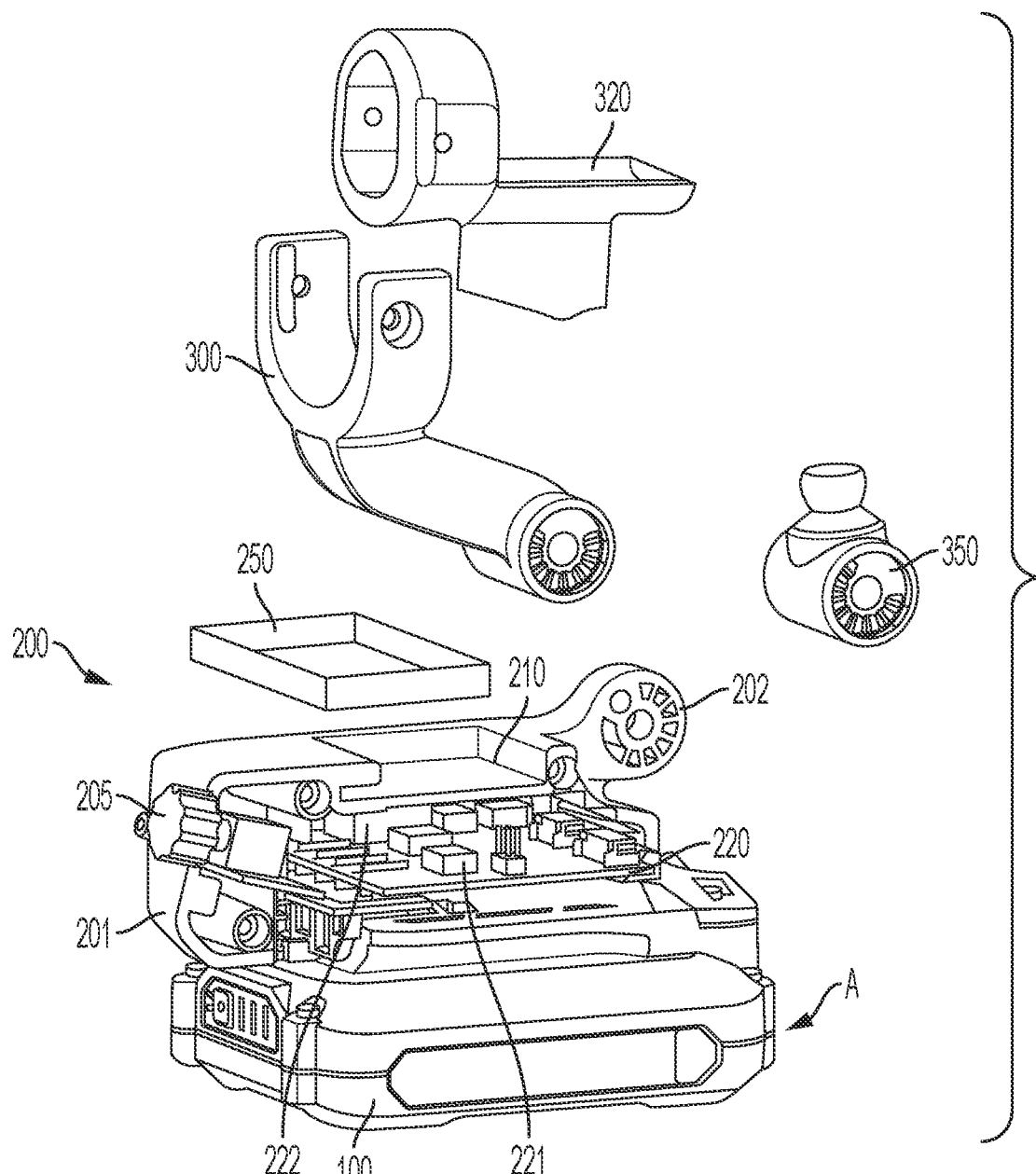
FIG. 1 is an illustrative view of a battery pack and common base features according to an exemplary embodiment of the present application.

FIG. 1 illustrates components of the base 200. FIG. 1 is a partially exploded view and one half of a housing 201 of the common base 200 is removed to illustrate internals. As is shown in FIG. 1, the common base 200 comprises a housing 201. The housing 201 is removably attachable to the power tool battery pack 100. There is an actuator 205 on the front of the housing 201. The actuator 205 may be used to turn on or off one of the variety of tools. For example, the actuator 205 may be used to turn on or off the rotary tool 400, lamp light 700, fan 800, etc. In the exemplary embodiment, the actuator 205 is a rotatable knob, but other actuators are possible. The actuator 205 may provide a variable input. For example, turning the knob more may increase the speed or intensity of the tool. For example, the knob may be used to control the fan 800 rotation or rotary tool 400 rotation at different speeds. Similarly, the knob may control the intensity of the light for the lamp light 700. In other embodiments the actuator 205 could simply turn a tool on and off. Additionally, the actuator 205 may in some tools serve only as an on and off actuator and in other tools provide different settings, such as different speed or intensity settings.

The housing 201 also houses a circuit board 220 including a controller 221. The controller 221 can provide a proportional 100 W (watts) PWM (pulse-width-modulation) power delivery system that allows for the setting of speed, temperature control, lighting control or fan speed, depending upon the particular tool. The proportional pulse-width-modulation power delivery may be in the range of 80 W to 120 W. pulse-width-modulation power delivery may be in the range of 50 W to 150 W. The circuit board 220 may be a printed circuit board. The controller 221 may include a microprocessor. There may be a memory 222 on the circuit board 220 and the controller 221 may itself have a memory component. Other components may also be mounted on the circuit board 220 such as sensors, resistors or charge and discharge controls. The circuit board 220, controller 221, memory 222 and the provided pulse-width-modulation power delivery may be the same for each of the tools. That allows the same design to be used for a variety of different tools 400, 500, 600, 700, 800. Each of the tools 400, 500, 600, 700, 800 has a base that is similar to the common base 200.

As is further shown in FIG. 1, the housing 201 includes a recess 210. When used for some tools, the recess can hold a stamped aluminum tray 250 for holding a solder sponge or other component. Additionally, the housing 201 has a pivot projection 202 which allows pivoting attachment to various tools. The pivot projection 202 attaches to tool arm rest 300. The tool arm rest 300 may be used to hold a variety of different tools. In other embodiments, the pivot projection 202 may attach to an alternate tool holder 350. In other embodiments there are additional tool specific features, such as a tool rest 320.

As shown in FIGS. 2-6, the battery pack 100 serves as a weighted base for each of the tools 400, 500, 600, 700, 800. The battery pack 100 may be placed on a stable surface, such as a flat horizontal surface made by a table or floor and remain in place. The tools 400, 500, 600, 700, 800 each have working portions which can be remote from the battery pack 100 and the respective bases and base housings. The working portions of the tools may be connected to the base, base housings and battery packs 100 by a connection section. The connection section may in some instances be a cord, as in the rotary tool 400, glue gun 500 and soldering iron 600. In other instances the connection section may be a movable stand, such as with the light 700 and the fan 800. In each instance, the common control hardware and a similar housing can be used to connect to the battery pack 100 serving as a weighted base of the product. At the same time, each tool can perform work away from the base and battery pack 100 owing to the connection section.

As is shown in FIG. 1, the battery pack 100 is connected to the base 200 in a direction A. The PCB 220 is disposed in a plane parallel to the direction A. The PCB 220 is also disposed in a plane parallel to a bottom of the battery pack 100 and a central major plane of the battery pack 100.

FIG. 2 illustrates the rotary tool 400. The rotary tool 400 is powered by the removable battery pack 100. The rotary tool 400 has a base 450 with a base housing 451. The base housing 451 houses the same components as the base housing 201 shown in FIG. 1. In particular, the base housing 451 houses a printed circuit board (PCB) 220 on which a controller 221 and a memory 222 are mounted. The user operated actuator 455 is connected to the controller 221 through the PCB 220. As shown in FIG. 2, the rotary tool 400 is connected to the base housing 451 by a cord 401 which carries power to the rotary tool 400. The cord 401 allows the rotary tool 400 to be used and positioned remote from the base housing 451 and in a variety of orientations.

FIG. 3 illustrates the glue gun 500. The glue gun 500 is also powered by the removable battery pack 100. The glue gun 500 has a base 550 with a base housing 551. The base housing 551 houses the same components as the base housing 201 shown in FIG. 1. In particular, the base housing 551 houses a printed circuit board (PCB) 220 on which a controller 221 and a memory 222 are mounted. The user operated actuator 555 is connected to the controller 221 through the PCB 220. In this case, the user operated actuator 555 is on the glue gun housing. As shown in FIG. 3, the glue gun 500 is connected to the base housing 551 by a cord 501 which carries power to the rotary tool 500. The cord 501 allows the glue gun 500 to be used and positioned remote from the base housing 551 and in a variety of orientations. The glue gun 500 may rest on tool rest 520.

FIG. 4 illustrates the soldering iron 600. The soldering iron 600 is powered by the removable battery pack 100. The soldering iron 600 has a base 650 with a base housing 651. The base housing 651 houses the same components as the base housing 201 shown in FIG. 1. In particular, the base housing 651 houses a printed circuit board (PCB) 220 on which a controller 221 and a memory 222 are mounted. The user operated actuator 655 is connected to the controller 221 through the PCB 220. In this case, the user operated actuator 655 controls the temperature of the soldering iron 600. As shown in FIG. 4, the soldering iron 600 is connected to the base housing 651 by a cord 601 which carries power to the soldering iron 600. The housing 651 includes a recess for a sponge 653. The cord 601 allows the soldering iron 600 to be used and positioned remote from the base housing 651 and in a variety of orientations. The soldering iron 600 is shown in FIG. 4 resting in a tool rest 620. The tool rest 620 is pivotably attached to the base housing 651.

FIG. 5 illustrates the lamp light 700. The lamp light 700 is powered by the removable battery pack 100. The lamp light 700 has a base 750 with a base housing 751. The base housing 751 houses the same components as the base housing 201 shown in FIG. 1. In particular, the base housing 751 houses a printed circuit board (PCB) 220 on which a controller 221 and a memory 222 are mounted. The user operated actuator 755 is connected to the controller 221 through the PCB 220. The user operated actuator 755 can turn the light on and off and adjust the brightness of the light 700. As shown in FIG. 5, the lamp light 700 includes a collapsible stand 701 for changing the orientation of the light given off by the lamp light 700.

FIG. 6 illustrates the fan 800. The fan 800 is powered by the removable battery pack 100. The fan 800 has a base 850 with a base housing 851. The base housing 851 houses the same components as the base housing 201 shown in FIG. 1. In particular, the base housing 851 houses a printed circuit board (PCB) 220 on which a controller 221 and a memory 222 are mounted. The user operated actuator 855 is connected to the controller 221 through the PCB 220. The user operated actuator 855 can turn the fan 800 on and off and control the speed of rotation of the fan 800. As shown in FIG. 6, the fan 800 includes a pivoting stand 801 for changing the orientation of the fan 800. The pivoting stand 801 includes two pivots 802 and 803.

Figure 7:
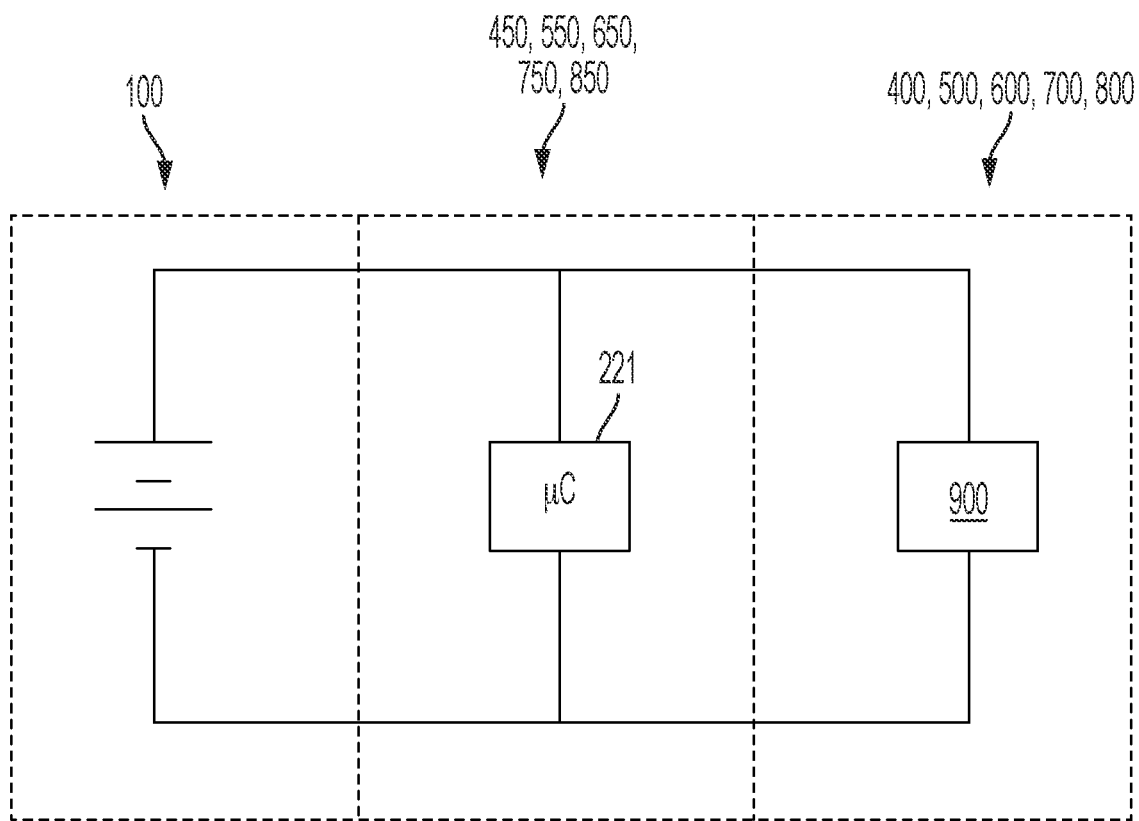
FIG. 7 is a schematic of a battery pack, base and tool according to an exemplary embodiment of the present application.

FIG. 7 is a schematic illustration of the battery pack 100, base 450, 550, 650, 750, 850 and the various tools 400, 500, 600, 700, 800. As shown, the battery pack 100 is connected to the controller 221. As discussed above, the controller 221 provides a PWM power delivery to the tools 400, 500, 600, 700, 800, such as a tool specific component 900. The tool specific component 900 varies depending on the particular tool. For example, the tool specific component 900 may be a motor in the event of the rotary tool 400 and the fan 800. The motor would be driven to drive the rotary tool 400 or the fan blades of the fan 800. In the case of the lamp light 700, the tool specific component 900 may be one or more light-emitting-diodes (LEDs). The LEDs are driven by the power supplied by the controller 221 from the battery pack 100 to produce the light of the lamp light 700. For the glue gun 500 and the soldering iron 600, the tool specific component 900 may be a heating element such as a resistive heating element. As will be appreciated, the heating element will provide the heat for melting the glue for the glue gun 500 or allowing soldering by the soldering iron 600.

In addition to the tools shown in FIGS. 2-6, other small detail tools may be part of the system. For example, small die grinders, chisels, polishers and reciprocating knives.

As will be appreciated, the removable battery pack 100 is a power tool battery pack. Accordingly, the battery pack 100 may also power other power tools including larger tools such as a drill, impact driver, circular saw, etc. which may not share the common base, electronics and connection section as the embodiments of the present application.

Although the present technology has been described in detail for the purpose of illustration based on what is currently considered to be the most practical and preferred embodiments, it is to be understood that such detail is solely for that purpose and that the technology is not limited to the disclosed embodiments, but, on the contrary, is intended to cover modifications and equivalent arrangements that are within the spirit and scope of the appended claims. For example, it is to be understood that the present technology contemplates that, to the extent possible, one or more features of any embodiment can be combined with one or more features of any other embodiment.

Additionally, while the exemplary embodiment is described with respect to an oscillating tool, the methods and configurations may also apply to or encompass other power tools such as other tools holding accessories.

What is claimed is:

1. A tool comprising:
a tool base including a tool base housing;
a power tool battery pack removably connected to the tool base, the power tool battery pack configured to serve as a weighted base for placement on a stable surface such that the tool remains in place;
a tool working section;
a connection section connecting the tool base to the tool working section;
wherein the connection section comprises a flexible section configured to allow the tool working section to perform work away from the base;
wherein the tool base further comprises an actuator;
wherein the tool working section comprises a motor;
wherein the actuator is configured to control a speed of the motor; and
wherein the flexible section is longer than the power tool battery pack.

2. The tool of claim 1, wherein the tool comprises at least one of a fan and a rotary tool.

3. The tool of claim 2, wherein the actuator is configured to turn the tool on and off.

4. The tool of claim 1, wherein the actuator is a rotary knob.

5. The tool of claim 1, further comprising a printed circuit board disposed in the tool base housing;

a controller on the printed circuit board; and
discharge controls on the printed circuit board;
wherein the tool base is disposed adjacent to the power tool battery pack;
wherein the tool base largely overlaps the power tool battery pack; and
wherein the controller is configured to provide a proportional pulse-width-modulation power delivery system that allows for setting the speed of the motor.

6. The tool of claim 1, further comprising a printed circuit board disposed in the tool base housing; and
a controller on the printed circuit board;
wherein the tool base is disposed adjacent to the power tool battery pack.

7. The tool of claim 6, wherein the printed circuit board is disposed in a plane generally parallel to a bottom of the power tool battery pack.

8. The tool of claim 7, wherein the tool base is disposed generally parallel to the power tool battery pack.

9. The tool of claim 8, wherein the tool base largely overlaps the power tool battery pack.

10. The tool of claim 6, wherein the controller is configured to provide a proportional pulse-width-modulation power delivery system that allows for setting the speed of the motor.

11. The tool of claim 6, further comprising discharge controls on the printed circuit board.

12. The tool of claim 6, further comprising a rest configured to support a portion of the tool working section.

13. A rotary tool, comprising:
a tool base including a tool base housing;
a controller in the tool base housing, the controller configured to provide proportional pulse-width-modulation power delivery;
a discharge control component in the tool base housing;
a power tool battery pack removably connected to the tool base, the power tool battery pack configured to serve as a weighted base for placement on a stable surface such that the tool remains in place;
a tool working section;
a connection section connecting the tool base to the tool working section;
wherein the connection section comprises a cord;
wherein the tool working section comprises a motor;
wherein the cord is configured to carry power from the power tool battery pack connected to the tool base to the tool working section; and
wherein the cord is longer than the power tool battery pack.

14. The rotary tool of claim 13, wherein the tool base further comprises an actuator.

15. The rotary tool of claim 14, wherein the actuator is configured to control a speed of the motor.

16. The rotary tool of claim 13, further comprising a rest configured to support a portion of the tool working section.

17. The rotary tool of claim 13, wherein the tool base housing further comprises a recess on an upper side of the tool base housing.

18. A rotary tool, comprising:
a tool base including a tool base housing;
a power tool battery pack removably connected to the tool base, the power tool battery pack configured to serve as a weighted base for placement on a stable surface such that the tool remains in place;
a tool working section;
a connection section connecting the tool base to the tool working section;
wherein the connection section comprises a cord;
wherein the tool working section comprises a motor;
wherein the cord is configured to carry power from the power tool battery pack connected to the tool base to the tool working section;
wherein the tool base further comprises an actuator;
wherein the actuator is configured to control a speed of the motor; and
wherein the cord is longer than the power tool battery pack.

19. The rotary tool of claim 18, further comprising a controller in the tool base housing; and
wherein the controller is configured to provide proportional pulse-width- modulation power delivery.

20. A rotary tool, comprising:
a tool base including a tool base housing;
a power tool battery pack removably connected to the tool base, the power tool battery pack configured to serve as a weighted base for placement on a stable surface such that the tool remains in place;
a tool working section;
a connection section connecting the tool base to the tool working section;
wherein the connection section comprises a flexible member;
wherein the tool working section comprises a motor;
wherein the flexible member is configured to carry power from the power tool battery pack connected to the tool base to the tool working section;
wherein the tool base further comprises an actuator;
wherein the actuator is configured to control a speed of the motor; and
wherein the flexible member is longer than the power tool battery pack.

21. A rotary tool, comprising:
a tool base including a tool base housing;
a power tool battery pack removably connected to the tool base, the power tool battery pack configured to serve as a weighted base for the rotary tool such that a bottom of the power tool battery pack is configured to rest on a stable surface and the tool base housing is generally above the battery pack;
a rotary tool working section comprising a motor;
a cord connecting the tool base to the rotary tool working section;
wherein the cord is configured to carry power from the power tool battery pack connected to the tool base to the rotary tool working section to provide power to the motor; and
wherein the cord is longer than a length of the tool base housing.

22. The rotary tool of claim 21, further comprising a circuit board in the tool base housing.

23. The rotary tool of claim 22, wherein the cord extends from an end of the tool base housing.

24. A rotary tool, comprising:
a tool base including a tool base housing;
a power tool battery pack removably connected to the tool base, the power tool battery pack configured to serve as a weighted base for the rotary tool such that a bottom of the power tool battery pack is configured to rest on a stable surface and the tool base housing is generally above the battery pack;
a rotary tool working section comprising a motor;
a cord connecting the tool base to the rotary tool working section;

wherein the cord is configured to carry power from the power tool battery pack connected to the tool base to the rotary tool working section to provide power to the motor;

further comprising an actuator on the tool base;

wherein the actuator is configured to control a speed of the motor; and wherein the actuator is a rotary actuator.

* * * * *